United States Patent [19]
Nowak et al.

[11] Patent Number: 5,971,463
[45] Date of Patent: Oct. 26, 1999

[54] RECEPTACLE, SUCH AS AN ASHTRAY, GLOVE COMPARTMENT OR THE LIKE FOR VEHICLES

[75] Inventors: Manfred Nowak, Solingen; Roland Ganssler; Elke Grunzner, both of Wuppertal, all of Germany

[73] Assignee: Becker Group Europe GmbH, Wuppertal, Germany

[21] Appl. No.: 09/124,865

[22] Filed: Jul. 30, 1998

[51] Int. Cl.[6] .................................................. B60R 7/00
[52] U.S. Cl. ........................................ 296/37.8; 296/37.9
[58] Field of Search ................................ 296/37.8, 37.9, 296/37.12, 37.13

[56] References Cited

U.S. PATENT DOCUMENTS 4,239,277  12/1980  Oda ......................................... 296/37.12
5,680,974  10/1997  Vander Sluis ............................ 296/37.9

*Primary Examiner*—Gary C. Hoge
*Attorney, Agent, or Firm*—Harness, Dickey & Pierce, P.L.C.

[57] ABSTRACT

A receptacle, such as an ashtray, glove compartment or the like for vehicles, is described, comprised of a housing, a cover, which is hinged to the housing along a rim edge and extends over the housing with at least one curved guide arm, and a releasable detent device for maintaining the cover against the force of an opening spring in the closed position when the cover covers the housing. The detent device, which can be actuated by acting on the cover, has a heart-shaped control cam, which is arranged on the guide arm and embodied as a connecting link groove. A bolt, which is formed on a hinged lever on the housing side, acts against the cam and rests in a lockable manner therewith. In connection with this receptacle, it is provided in accordance with the invention that a blocking device, which reacts to extreme changes in velocity, is arranged on the housing. The blocking device prevents the hinged lever from relinquishing its position thereby maintaining the cover in the locked position.

4 Claims, 2 Drawing Sheets

RECEPTACLE, SUCH AS AN ASHTRAY, GLOVE COMPARTMENT OR THE LIKE FOR VEHICLES

FIELD OF THE INVENTION

The invention relates to a receptacle, such as an ashtray, glove compartment or the like for vehicles, comprised of a housing, a cover and a releasable detent device. The cover is hinged to the housing along a rim edge of the housing and extends over the housing. The cover has at least one curved guide arm. The releasable detent device maintains the cover against the force of an opening spring in the closed position, when the cover covers the housing. The detent device, which can be actuated by acting on the cover, has a heart-shaped control cam. The heart-shaped control cam is arranged on the guide arm and is embodied as a connecting link groove, against which a bolt, formed on a hinged lever on the housing side, rests in a lockable manner.

BACKGROUND OF THE INVENTION

Generally, a two-step directional locking mechanism has been used in known receptacles, in particular, ashtrays, such as has been long known from a ballpoint pen mechanism. Such receptacles have enjoyed increasing popularity because of their easy and simple handling (e.g., automatic tipping). However, an unpleasant disadvantage was noted in the actual use of these receptacles, which was that the ashtray drawer or the cover did not dependably remain in the locked position when the receptacle was subjected to extreme changes in speed. But such changes in speed of a receptacle in vehicles usually occur during normal driving operations when, for example, passing through deep potholes, strong undulations of the ground and the like, but in particular in case of accidents with abrupt changes of velocity. Also, dynamic pressure (deceleration impulse) when slamming a door shut can result in an unintentional opening of the detent device.

An ashtray for motor vehicles is known from German Patent Publication DE 39 30 271 A1, which comprised of a housing, which can be fastened in a wall recess, and an ashtray drawer which is movably seated therein. The ashtray drawer, after releasing a detent, can be moved from a non-use position into a use position by means of the force of an opening spring. In particular, the detent can be released by slight pressure on the ashtray drawer against the force of the opening spring so that the ashtray drawer can then be moved into an use position in the direction opposite the direction of pressure exerted by the opening spring. To prevent the unintentional opening of the ashtray drawer, at least one additional spring, which supports the opening spring, was provided with this ashtray. The pressure on the ashtray drawer which causes the release of the detent is made more difficult by the additional spring, and, therefore, also the unintentional release of the ashtray drawer detent.

OBJECT AND SUMMARY OF THE INVENTION

It is the object of the invention to make available a receptacle of the type mentioned above wherein an unintentional release of the detent device is assured by simple, dependably operating means, without increasing the actuation force which must be exerted on the cover for the purpose of unlocking it.

For attaining this object, the invention provides that a blocking device, which reacts to extreme changes in velocity, is arranged on the housing. The blocking device prevents the hinged lever (of the detent device) from relinquishing its position, thereby maintaining the cover in the locked position.

The blocking device is preferably comprised of an one-armed lever, one end of which is rotatable against the force of a retaining spring around a shaft oriented parallel with the shaft of the hinged lever. In case of the effects of an extreme change in velocity, the one-armed lever may be pivoted from a position of rest, when aligned obliquely in relation to the hinged lever, into a blocking position, when aligned vertically in relation to the hinged lever and also supported with its free end on the hinged lever.

The blocking device is therefore comprised of a small lever, which is hinged on the housing, and a spring, which maintains the lever in the position of rest, but whose force is not sufficient to counteract a lever movement in case of an abrupt change in velocity. It is understood that such a blocking device for a receptacle of the type in question is not important as far as costs are concerned, but nevertheless performs the task for which it is intended in an optimal manner. In one embodiment of the invention, the free end of the one-armed lever can be designed in the manner of a hammer head with a downward oriented weight center of gravity.

An exemplary embodiment of the invention will be explained in more detail below by means of the drawings.

DETAILED DESCRIPTION OF THE PREFERRED EMBODIMENT

Figure 1:
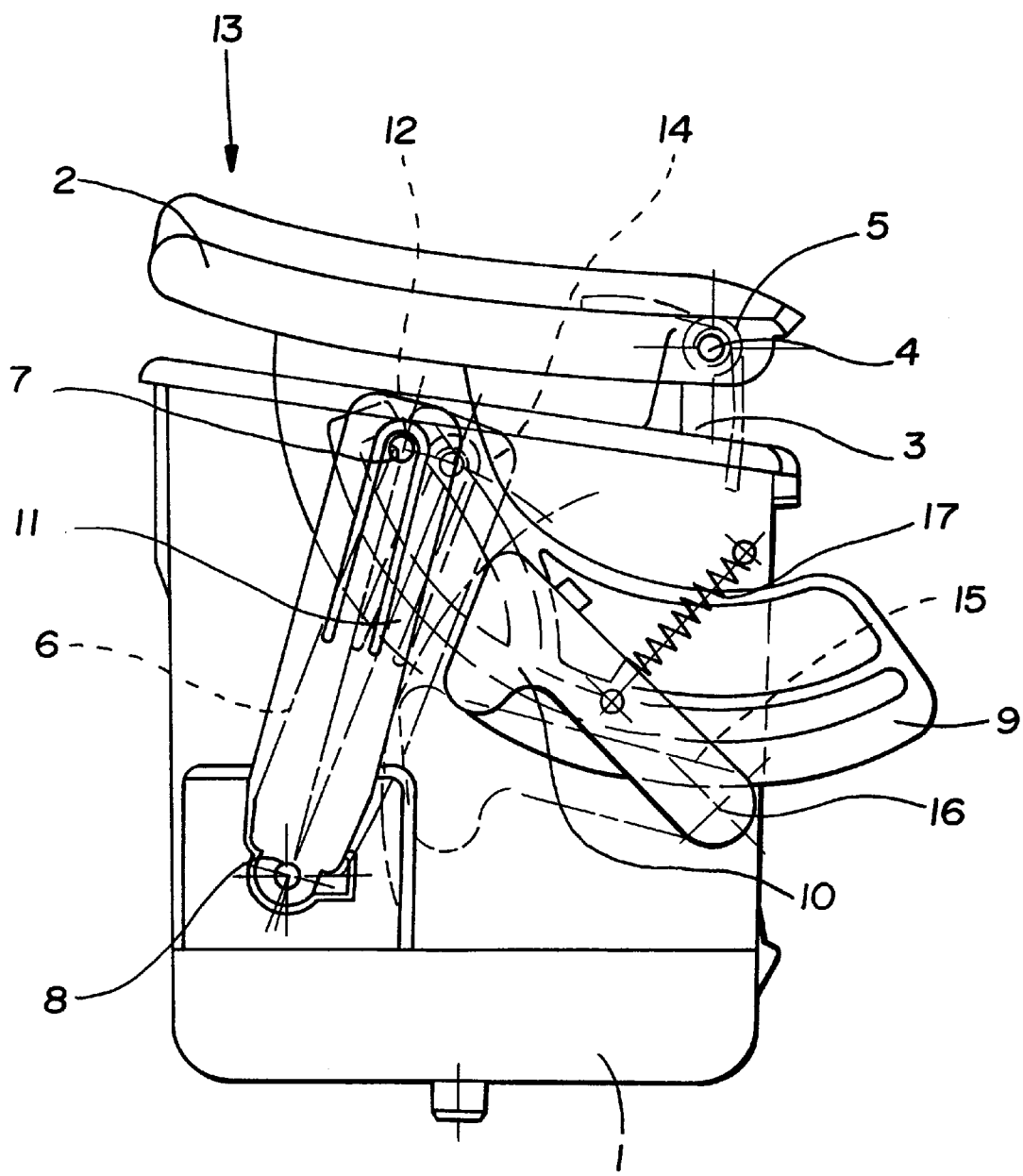
FIG. 1 illustrates a receptacle with a closed cover.
Figure 2:
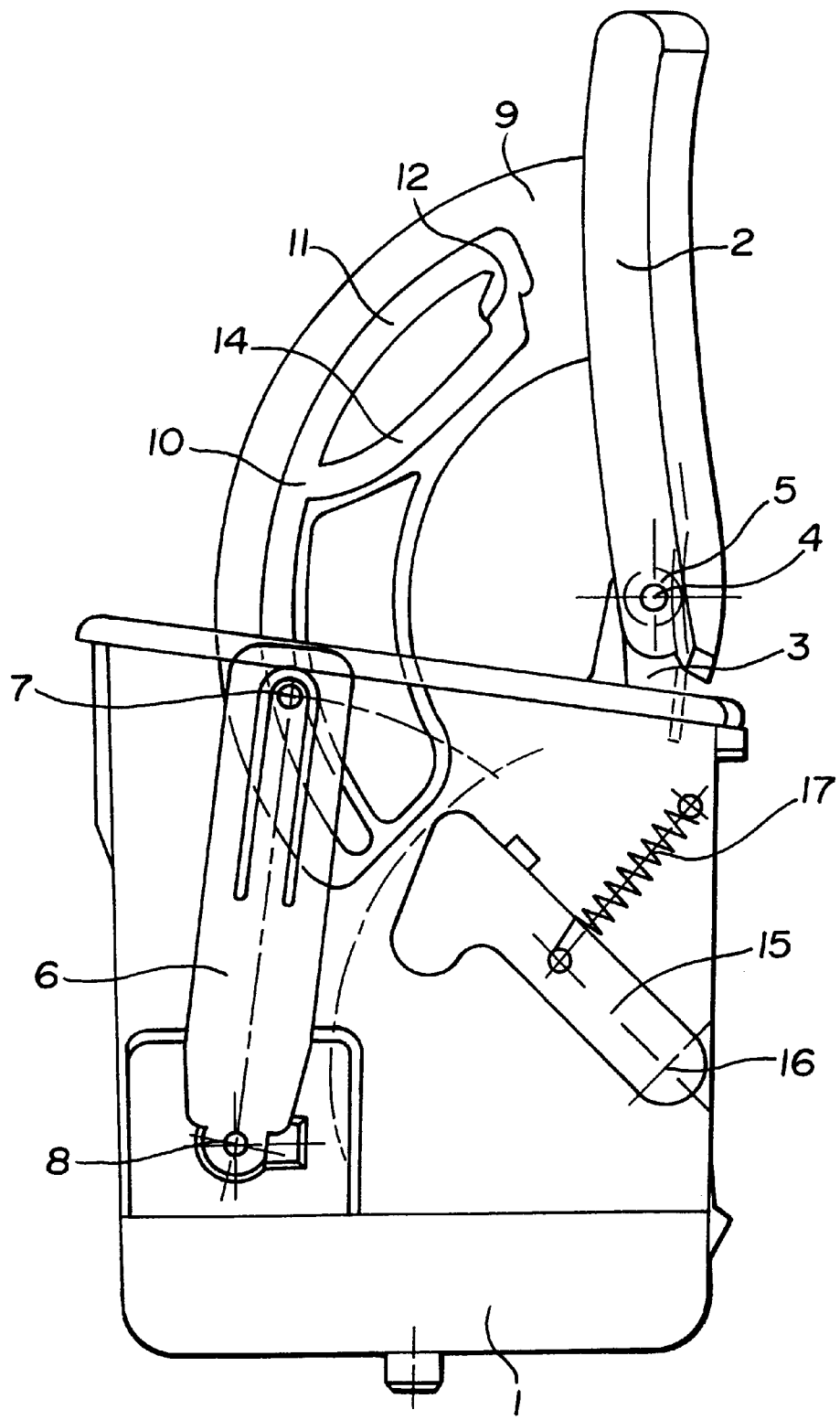
FIG. 2 illustrates the receptacle of FIG. 1 with the cover opened.

The receptacle of the present invention may be an ashtray, a glove compartment, a cup holder, a compartment for glasses or the like in vehicles. As shown in FIGS. 1 and 2, the receptacle is comprised of a box-like housing 1 and a cover 2, which closes the housing opening when not in use. The housing 1 is designed with projecting brackets 3 in a rim area of the housing 1, in which a shaft 4 is seated which supports the cover 2. In addition, the shaft 4 supports a leg spring 5, indicated by dashed lines, which is used as an opening spring and which tries to change the cover 2 from its closed position in accordance with FIG. 1 into its open position in accordance with FIG. 2.

A releasable detent device for holding the cover 2 in the closed position against the force of the leg spring 5 is a further part of the receptacle. The detent device includes a hinged lever 6 which is arranged on a journal or shaft 8 on the housing 1 and which has a bolt 7 in the free end section of the lever 6. The detent device furthermore comprises a curved guide arm 9 arranged on the cover 2, which extends parallel with the wall of the housing 1 facing the viewer. The guide arm 9 has a heart-shaped control cam 10, which in turn has a track 11. The guide arm 9 and, in particular, the control cam 10 works together with the bolt 7 of the hinged lever 6 and is designed as a connecting link groove. In the course of closing the cover 2, the bolt 7 travels the track 11 of the control cam 10, in order to drop at the end of the path 11 into a recess 12 used as the detent position. In the detent position, the bolt 7 is maintained by the force of the leg spring 5 acting on the cover 2. To open the cover 2 again, it is necessary to act on it slightly in the direction of the arrow 13. As a result of such action, the bolt 7 is pushed out of the recess 12 and is forced into the path 14 of the control cam 10. After slightly touching the cover 2 in the direction of the arrow 13, the opening movement follows as a result of the leg spring 5 acting on the cover 2. So that the opening movement of the cover 2 does not take place suddenly, the guide arm 9 has teeth in the form of a rack (not shown) on its back, which mesh with the pinion of a brake (also not shown).

In the course of a change in velocity (such as a whiplash movement) abruptly acting on the receptacle, triggering of the detent device can take place automatically by an unintentional cover movement in the arrow direction 13, since a slight cover movement already triggers the opening impulse. To prevent the unintentional opening of the cover 2, it has now been provided to block the hinged lever 6, so that the lever 6 cannot pivot out into the position shown in dash-dotted lines and the bolt 7 cannot enter the path 14 of the control cam 10. To this end, an one-armed lever 15 is disposed on the wall of the housing 1, on which the hinged lever 6 is also seated. The one-armed lever 15 may be rotated at one end on a shaft 16, which is oriented parallel with the shaft 8 of the hinged lever 6. The lever 15 is maintained by a spring 17 in its position of rest (shown in solid lines), when the lever 15 is aligned obliquely in relation to the hinged lever 6. The lever 15 plays no part at all in the intentional opening and closing of the cover 2, i.e., the use of the receptacle in accordance with its purpose. The lever 15 only functions when an extreme change in velocity acts on the receptacle and causes it to pivot out of its position of rest (shown in solid lines in FIG. 1) oriented obliquely in respect to the hinged lever 6 into a position of use (shown by dash-dotted lines in FIG. 1). In the position of use, the lever 15 is aligned vertically in relation to the hinged lever 6, when the lever 15 is supported on the hinged lever 6. The hinged lever 6 is blocked because of this and cannot react to an opening impulse originating from the cover 2. It is obvious that the lever 15 can react to a change in velocity considerably faster than the opening mechanism of the cover 2, which is sluggish in comparison with it. The weight center of gravity of the lever 15 is located in its free end area, which has been realized by means of an increase in mass of the lever 15, such that the lever 15 is in the form of a hammer head-like design.

Of course, it should be understood that a wide range of changes and modifications can be made to the embodiments described above. It is therefore intended that the foregoing description illustrates rather than limits this invention, and that it is the following claims, including all equivalents, which define this invention.

What is claimed is:

1. A receptacle, comprising:

a housing, a cover, which extends over the housing, the cover further comprising at least one curved guide arm, an opening spring, a releasable detent device for maintaining the cover against the force of the opening spring in the closed position when the cover covers the housing, wherein the detent device may be actuated by acting on the cover, wherein the detent device includes a heart-shaped control cam which is arranged on the guide arm, a hinged lever and a bolt formed on the hinged lever, wherein the bolt acts against the cam to rest in a lockable manner, and a blocking device, which reacts to extreme changes in velocity, the blocking device being arranged on the housing, wherein the blocking device prevents the hinged lever from relinquishing its closed position, thereby maintaining the cover in the locked position.

2. The receptacle of claim 1 wherein the hinged lever has a shaft, and wherein blocking device is comprised of an one-armed lever, having a first end and a second free end opposite the first end, the one-armed lever having its own shaft, and a retaining spring, wherein the first end of the one-armed lever is rotatable against the force of the retaining spring around the shaft of the one-armed lever, wherein the shaft of the one-armed lever is oriented parallel with the shaft of the hinged lever, wherein, in the case of the effects of an extreme change in velocity, the one-armed lever may be pivoted from a position of rest, when the one-armed lever is aligned obliquely in relation to the hinged lever, into a blocking position, when the one-armed lever is aligned vertical in relation to the hinged lever and when the one-armed lever is supported with its second free end on the hinged lever.

3. The receptacle of claim 2 wherein the second free end of the one-armed lever is designed in the manner of a hammer head with a downward oriented weight center of gravity.

4. The receptacle of claim 1 wherein the housing has a rim edge and the cover is hinged to the housing along the rim edge.

* * * * *